United States Patent
Phippen

(10) Patent No.: US 6,776,863 B2
(45) Date of Patent: Aug. 17, 2004

(54) UNIVERSAL SPACER FOR TIRE BUILDING DRUM

(75) Inventor: Steven John Phippen, North Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 184 days.

(21) Appl. No.: 10/219,181

(22) Filed: Aug. 15, 2002

(65) Prior Publication Data

US 2004/0031569 A1 Feb. 19, 2004

(51) Int. Cl.⁷ .............................................. B29D 30/24
(52) U.S. Cl. ..................... 156/110.1; 156/414; 156/417
(58) Field of Search ................. 156/417–420, 156/414, 415, 416, 110.1; 411/535, 546, 384, 550, 137; 248/354.5; 403/324, 378, 379.5, 108, 319, 109.6; 74/544, 551.4, 551.5

(56) References Cited

U.S. PATENT DOCUMENTS

| | | | | |
|---|---|---|---|---|
| 811,035 A | * | 1/1906 | Chidester | 411/535 |
| 2,685,353 A | * | 8/1954 | Caskie | 403/108 |
| 2,687,268 A | * | 8/1954 | Hawes | 254/101 |
| 4,292,112 A | | 9/1981 | Kumagal | |
| 4,508,498 A | | 4/1985 | Collmann | |
| 5,269,870 A | * | 12/1993 | Mori | 156/420 |
| 5,340,258 A | * | 8/1994 | Simon | 411/535 |

* cited by examiner

Primary Examiner—Geoffrey L. Knable
(74) Attorney, Agent, or Firm—Howard M. Cohn

(57) ABSTRACT

According to the present invention, a universal spacer, connected to a traveling rod of a tread breaker tire building machine, incrementally adjusts the travel distance of the traveling rod and thereby controls the diameter of the building drum.

10 Claims, 3 Drawing Sheets

UNIVERSAL SPACER FOR TIRE BUILDING DRUM

TECHNICAL FIELD

The present invention relates to apparatus for setting the diameter of a tire building drum in which the diameter is set by means of a traveling rod and stop spacers, the varying diameters being to accommodate the construction of tires of different sizes on the same drum.

BACKGROUND OF THE INVENTION

Among the types of machines used in the assembly of pneumatic tires for motor vehicles is a drum upon which is assembled the tread assembly. The tread assembly generally includes the breaker(s), the overlay and the tread. For the latter arrangement, the machine is called a BOT (belt, overlay, tread) drum. The tread assembly is built separately from the tire carcass because of the inexpansible breaker assembly that lies radially inward of the tread.

Since a given tread building machine, or BOT drum, or machine, can be used to assemble tire treads of different diameters, the cylindrical diameter of the BOT drum is made to be variable, in precisely repeatable ways. The diameter of the machine is adjusted by means of pneumatic pressure acting upon a system of axially moving cams that operate to force the perimeter portions of the machine radially outward.

A given desired diameter of a BOT drum is achieved by applying pneumatic pressure which increases the radius of the machine's outer perimeter to a limit that is determined by the presence of spacer blocks placed upon two axially aligned and axial movable shafts that are contiguous with the moving cam assembly and located in diametric opposition in relation to the major axis of the drum. If no spacer blocks are used, the axially moving cam will move to its maximum position, thereby opening the drum to its maximum diameter. But when spacer blocks are installed upon the axial shafts, the cam will move only so far as to provide the precise desired BOT diameter. The latter diameter is determined by the size of the spacer blocks used to limit the movement of the cam. In this way, a tire tread assembly of a given diameter can be built. After a given tread assembly is built, the pneumatic pressure can be released so that the diameter of the BOT drum can be reduced (typically by springs) and the tread assembly can be removed from the drum. The pneumatic pressure is then reapplied to the drum in preparation for the next tread building process.

In present BOT drums, two spacer blocks of a given size, and selected from a plurality of sizes, are installed on the two axially aligned shafts to affect a given desired diameter of the BOT drum. This means that for each of the plurality of desired diameters, two spacer blocks of specific size are needed. This also means that a large set of pairs (often about 144 pairs) of spacer blocks are needed and kept in storage for use whenever a different maximum BOT diameter setting is needed.

Such a system of spacer blocks requires that the unused spacer blocks much be stored, accounted for, and be accessible as needed.

A screw type adjustable spacer design is described in U.S. Pat. No. 4,508,498 to Collmann, which is used in relation to a "tire shaping drum," a machine that is used in another phase of the tire building process. The tire shaping drum is used to give the characteristic toroidal shape to a tire carcass, which primarily includes the liner, ply layers and the sidewalls.

A screw type adjustable spacer of the sort taught by Collmann was tried on the BOT drum, but problems were encountered. The most critical was that such a spacer does not have fixed positions which means that once set, it can move and lose its adjustment size from the precise desired spacing distance. Most specifically, the spacer in the Collmann patent has the potential to change with vibration loosening. Also, the length of the Collmann type spacer is infinitely adjustable and the setting is under operator control and the length must be judged by making measurements. Further, the Collmann spacer is too large to fit into the BOT drum application without requiring major modification of the drum.

ASPECTS OF THE INVENTION

One aspect of the present invention is to provide a simple replacement for the plurality of spacer blocks employing a single adjustable or universal spacer such that two such spacers can be used on a given BOT drum to achieve the purpose of the plurality of spacer blocks ordinarily used.

Another aspect of the present invention is to make the universal spacer adjustable with regard to its role of replacing the spacer blocks of different sizes.

Yet another aspect of the present invention is to provide a universal spacer that can be easily and rapidly adjusted in fixed and repeatable incremental sizes to accommodate the specific required diameters of a given BOT drum.

SUMMARY OF THE INVENTION

According to the present invention, a universal spacer for varying the diameter of a tire tread breaker building drum comprises: a cylindrical outer body portion having a plurality of sets of diametrically opposed holes extending therethrough; an inner cylindrical portion having at least two diametrically opposed holes therethrough for varying the diameter of the tire tread breaker building drum; the inner cylindrical portion is connected by at least one traveling shaft (16) to the building drum for varying the diameter of the building drum; and structural means are provided for interconnecting the outer cylindrical body portion with the inner cylindrical portion to adjust the travel distance of the traveling rod and thereby control the diameter of the building drum.

Also according to the present invention, the structural means for interconnecting the outer cylindrical body portion with the inner body portion is a pin. The pin (36) is slideably engagable through any two diametrically opposed holes in the outer cylindrical body portion and through at least two diametrically opposed holes of the inner cylindrical body portion. One end of the pin is affixed with a finger grasping flange having a ring attached thereto.

Further according to the present invention, the sets of diametrically opposing holes in the outer cylindrical body portion are regularly spaced and are situated so as to comprise a plurality of diametrically opposed hole sets through which the pin can be inserted while also engaging at least two of the diametrically opposing holes in the inner moveable cylindrical body portion in such a way as to provide incremental and repeatable adjustment of the axial relationship of the outer cylindrical body portion and the inner cylindrical body portion.

Also according to the present invention, indicator numbers are located adjacent the holes of the outer cylindrical body portion so as to allow repeatable incremental adjustment of the relative axial positions of the outer cylindrical body portion and the inner cylindrical body portion by the means for interconnecting the outer cylindrical body portion with the inner cylindrical portion.

According to the present invention, the sets of diametrically opposing holes in the outer cylindrical body portion are arranged so as to comprise a regular double helical pattern about the circumference of the outer cylindrical body portion.

According to the present invention, a method of varying the diameter of a tire tread breaker building drum comprises: providing a cylindrical outer body portion having a plurality of sets of diametrically opposed holes extending therethrough; providing an inner cylindrical portion of a having at least two diametrically opposed holes therethrough, the inner cylindrical portion being connected by a traveling shaft to a cam component of the building drum for varying the diameter of the building drum; and interconnecting the outer cylindrical body portion with the inner cylindrical portion to adjust the travel distance of the traveling rod and thereby control the diameter of the building drum.

According to the present invention, the method includes interconnecting the outer cylindrical body portion with the inner body portion is accomplished with a pin.

Also according to the present invention, the method includes slideably engaging the pin through any two diametrically opposed holes in the outer cylindrical body portion and through at least two diametrically opposed holes of the inner cylindrical body portion.

BRIEF SUMMARY OF THE FIGURES

Reference will be made in detail to preferred embodiments of the invention, examples of which are illustrated in the accompanying figures. The figures are intended to be illustrative, not limiting. Although the invention is generally described in the context of these preferred embodiments, it should be understood that it is not intended to limit the spirit and scope of the invention to these particular embodiments.

Certain elements in the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
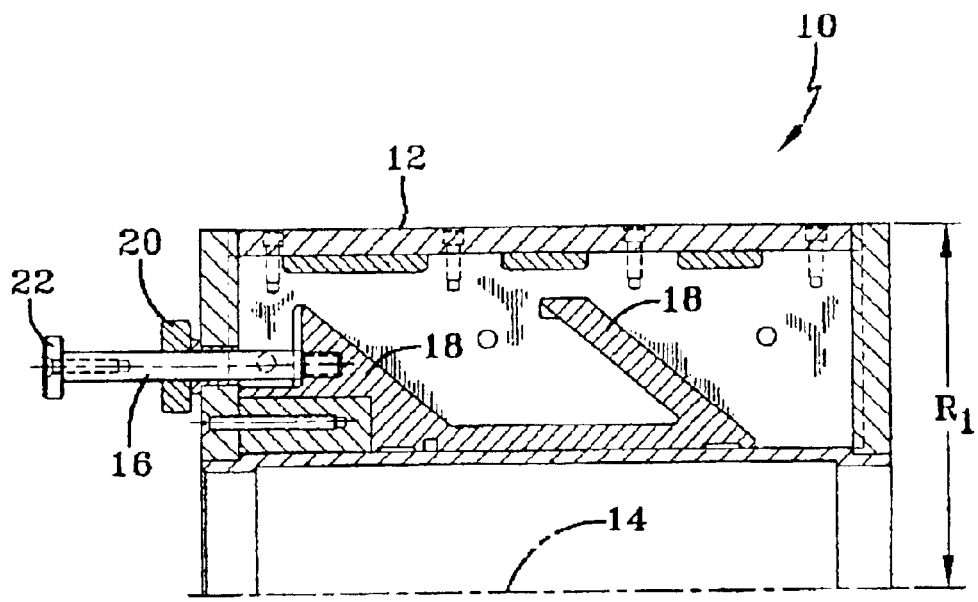
Figure 1B:
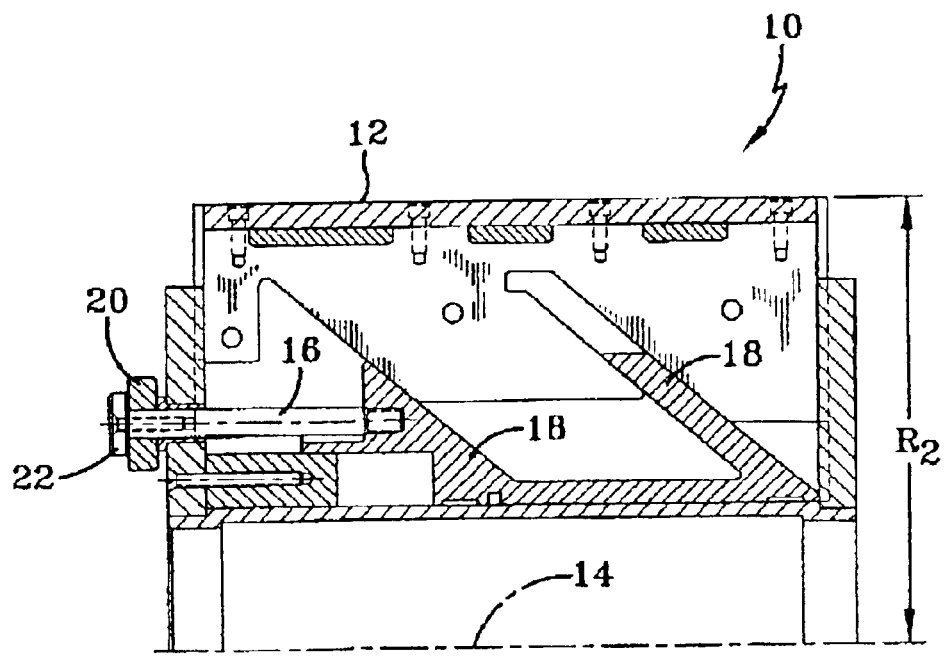
Figure 2:
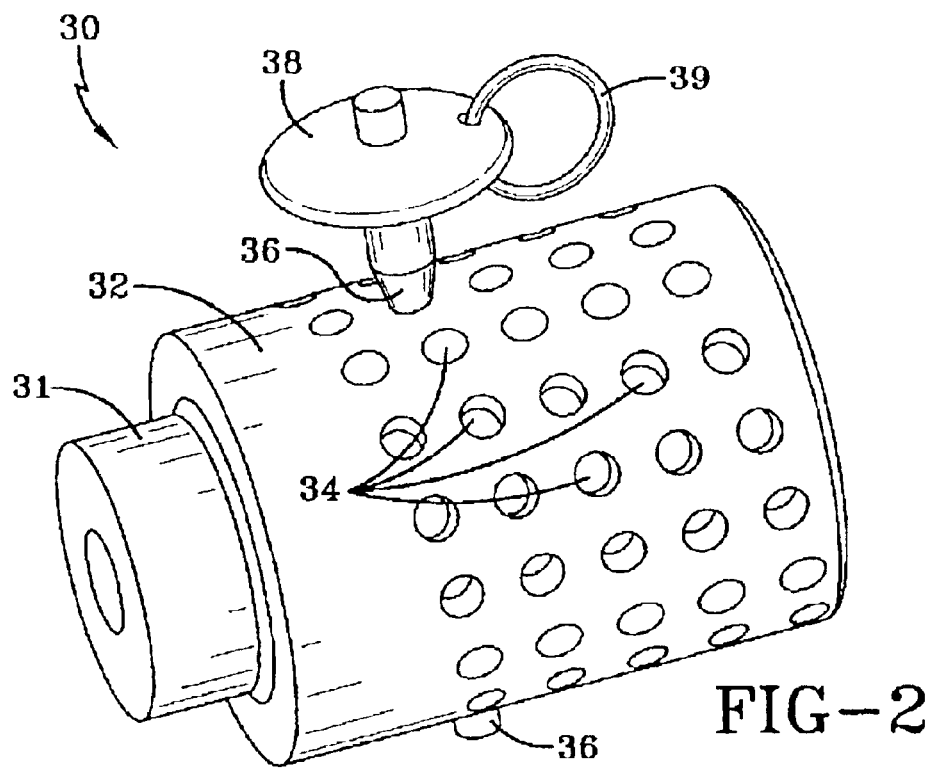
Figure 3:
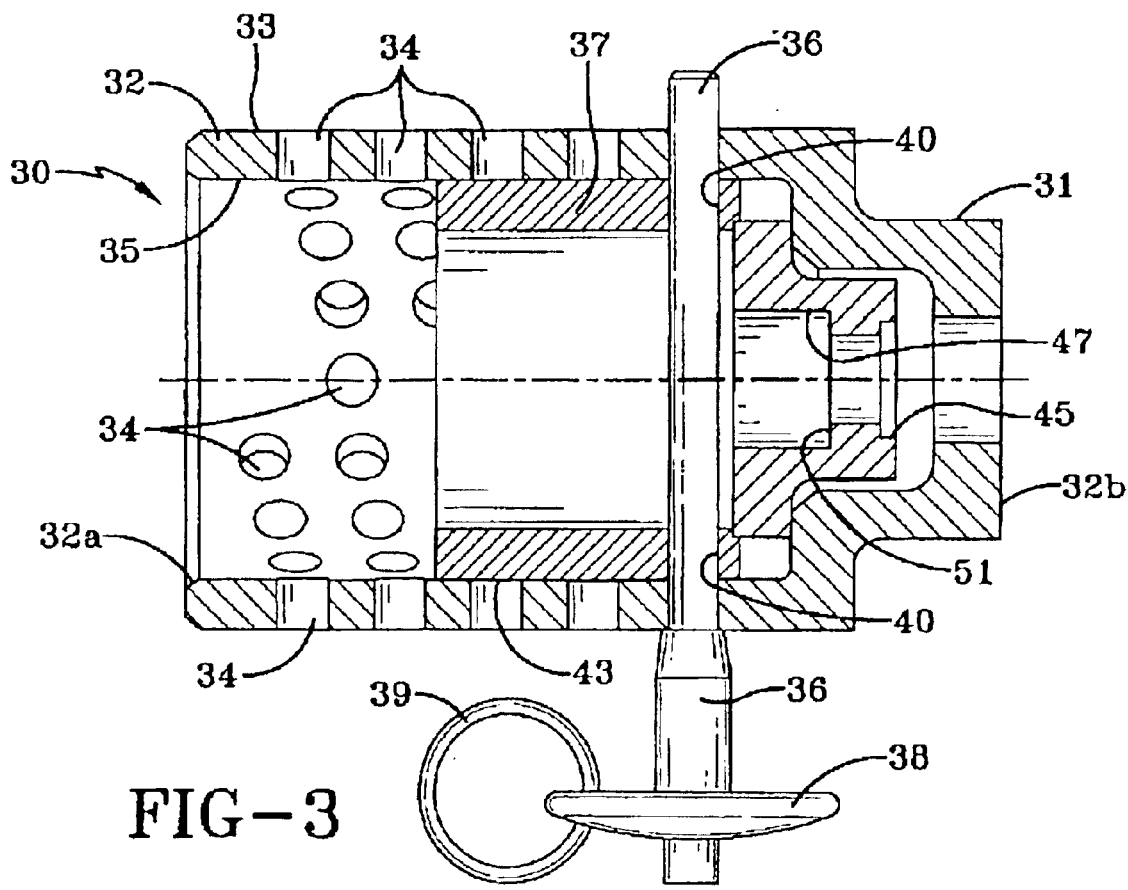
Figure 4A:
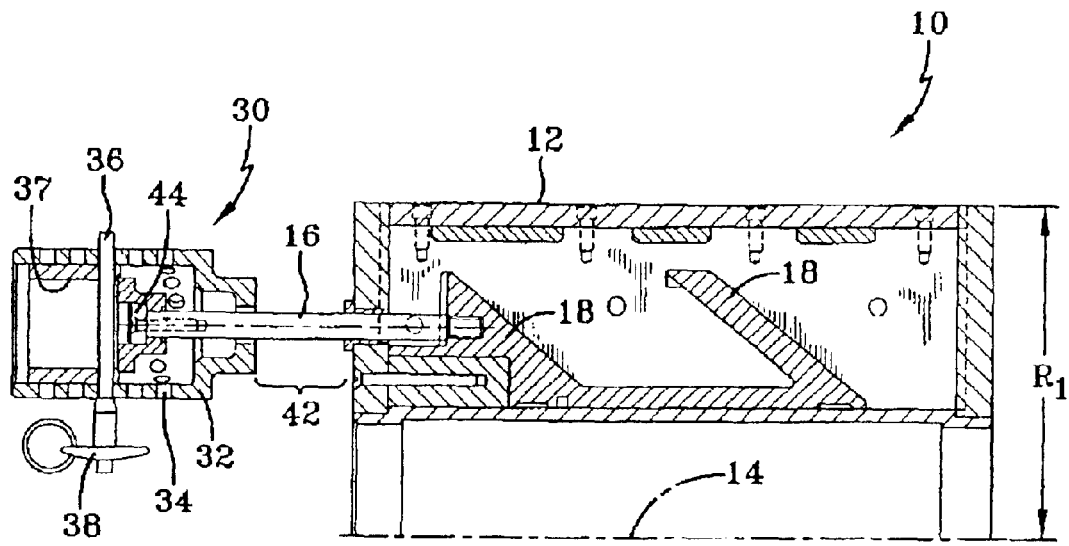
Figure 4B:
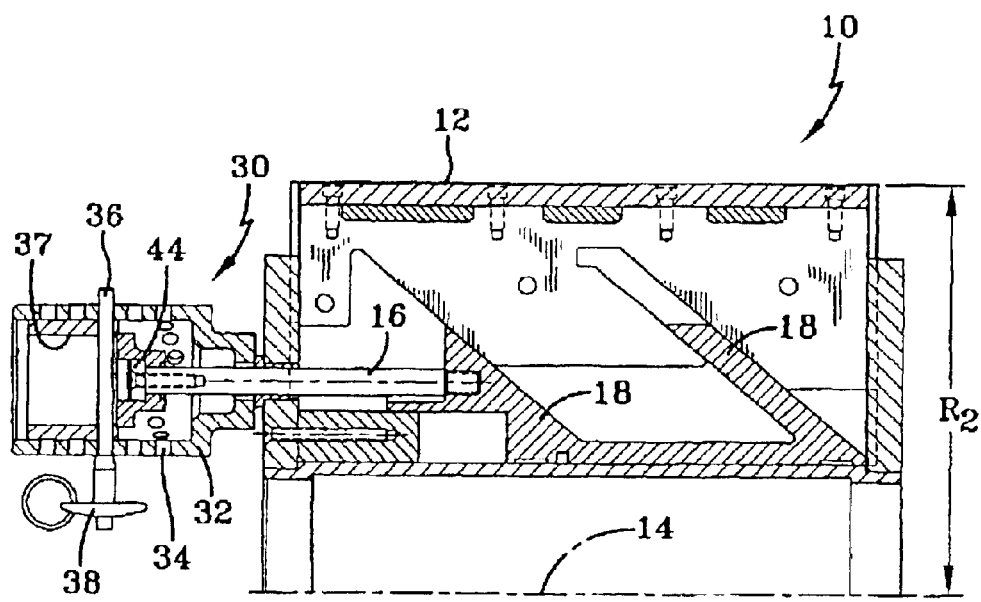

The structure, operation, and advantages of the present preferred embodiment of the invention will become further apparent upon consideration of the following description taken in conjunction with the accompanying drawings, wherein:

FIG. 1A is a cross sectional view of the prior art spacer block system shown in relation to a portion of a BOT drum in the collapsed mode;

FIG. 1B is a cross sectional view of the prior art spacer block system shown in relation to a portion of a BOT drum in the expanded mode, with the spacer block limiting the maximum diameter of the outer cylindrical surface;

FIG. 2 is an oblique view of the spacer block system of the present invention;

FIG. 3 is an orthogonal cross sectional view of the spacer block system of the present invention;

FIG. 4A is a cross sectional view of the spacer block system of the present invention shown in relation to a portion of a BOT drum in the collapsed mode; and FIG. 4B is a cross sectional view of the spacer block system of the present invention shown in relation to a portion of a BOT drum in its expanded mode, with the spacer block system of the invention limiting the maximum diameter of the outer cylindrical surface of the BOT drum.

DETAILED DESCRIPTION OF THE PRESENT INVENTION

The operation of the prior art spacer block method of limiting or controlling the diameter of a tire tread breaker package building drum 10 (which includes but is not limited to a BOT (belt overlay tread) drum) is evident upon examination of FIGS. 1A and 1B. In FIG. 1A, the outer cylindrical surface 12 of the drum 10 is shown in its maximal radially inward position, corresponding to a radius of $R_1$ with respect to center axis 14. A traveling shaft 16 is contiguous with a cam assembly 18 which moves axially to the right to force the outer cylindrical surface 12 radially outward, as shown in FIG. 1B where the radius of the cylindrical surface 12, with respect to the centerline 14, is $R_2$. Pneumatic force is used to move the cam 18 axially to the right from the position shown in FIG. 1A to the position shown in FIG. 1B. Typically, there is a spring component that will return the cam to its initial position once the pneumatic force is withdrawn. A prior art spacer block 20 limits the rightward motion of the traveling shaft (also called a rod) 16, when the screw/washer assembly 22 on the end of the shaft abuts against the spacer block 20, as shown in FIG. 1B. The thicker the spacer block 20 is, the smaller is the maximum radius $R_x$ of the outer cylindrical surface 12 of the BOT drum 10. In the prior art configuration, there are often 144 different sized spacer blocks for a single BOT drum. Since there are typically two shafts 16 for each drum 10, there are 288 total spacer blocks which must be stored.

Referring to FIGS. 2 and 3, an adjustable universal spacer 30 according to the present invention is shown in oblique view. The adjustable universal spacer 30 consists of three main components, an outer cylindrical body portion 32, and means, such as a pin 36 for interconnecting the outer cylindrical body portion with the inner cylindrical portion 37.

Referring to FIG. 3, the hollow, cylindrical, outer body portion 32 has an outer cylindrical surface 33 which necks down to a second, smaller outer cylindrical surface 31. The outer body portion 32 has a first inner surface 35 of a first diameter opening to one end 32a of the outer body portion 32 and a second inner surface of a second diameter smaller than the first diameter which necks down to an opening at the opposite open end 32b. A plurality of sets of diametrically opposed holes 34 extend between the inner and outer surfaces 35 and 33, respectively. The holes 34 are preferably disposed a regular double helix pattern about the circumference of the outer cylindrical body portion 32 so that the hole to hole offset results in the desired increments of drum diameters. The first and second groupings of holes that form the double helix start substantially 180° apart and are in a spiral configuration. The double helix is used so that a pin 36 will pass through both the outer and inner cylindrical body portions 32 and body portion 37, respectively, and extend outward from both sides of the outer cylindrical body portion. The double helix is used to provide fine incremental adjustment, minimal part size and maximum rigidity. The holes 34 are typically spaced a distance of 0.006 inches to 0.150 inches from each other in the direction of the double helix, although the exact distance is determined by the desired increments of expansion.

The axially moveable, hollow, inner cylindrical body portion 37, as shown in FIG. 3, has an outer surface 43 which is slideably received in the inner surface 35 of the outer body portion 32. The inner cylindrical body portion 37 has an end section 45 which has a first opening 47 opening into the body 37 and a second opening smaller than the first opening 47 to form a collar 51. The body 37 includes at least one pair of diametrically disposed holes 40, generally of the same diameter as the holes 34 in the outer body 32. Additional pairs of holes (not shown) in the inner body portion 37 allow for additional adjustments.

The pin 36 has a diameter corresponding to the respective holes 34 and 40 of the outer and inner cylindrical body portions 32 and 37 so that the pin 36 can be received therethrough. The pin 36 also has finger grasping flange 38 and a holding ring 39. The double helix pattern of the holes 34 enables the pin 36 to be introduced into one of the holes 34 in the outer portion 32 and then be slideably engagable and movable through at least two of the at least two diametrically opposed holes 40 of the inner cylindrical body 37 and into a diametrically opposite holes 34 of the outer body 32. The holes 34 and 40 of the outer and inner cylindrical body portions 32 and 37 are arranged to provide incremental and repeatable adjustment of the axial relationship of the outer cylindrical body portion with respect to the inner cylindrical body portion. The outer cylindrical body portion 32 is interconnected with the inner cylindrical portion 37 to adjust the travel distance of the traveling rod 36 and thereby control the diameter of the building drum 10.

In FIGS. 2 and 3, the double helices of holes 34 are arranged such that the slideably moveable inner cylinder 37 can be fixed firmly into a plurality of axial positions, by means of the pin 36, in axial relation to the hollow outer body portion 32. The double helices of holes 34 are situated so as to comprise a plurality of diametrically opposed hole sets through which the pin 36 can be inserted while also engaging the inner moveable cylindrical portion 37 through holes 40.

The operation of the universal spacer invention 30 becomes evident in FIGS. 4A and 4B, which show the same respective BOT drum arrangements as in FIGS. 1A, 1B, but with the present adjustable spacer invention 30 in place. More specifically, FIG. 4A shows the BOT drum 10 in its fully collapsed mode such that the radius of the outer cylindrical surface 12 is $R_1$. FIG. 4B shows the cam 18 moved to the right such that the outer cylindrical surface 12 is at a larger radius $R_2$ in relation to the center line 14. Rightward motion of the cam 18 is limited to the distance 42 shown in FIG. 4A, which is the maximum amount that the shaft 16 can move to the right before being stopped by the universal spacer invention 30. The universal spacer 30 is attached to the end of the traveling shaft 16, which extends through the opening 41 (FIG. 3), by means of the cap screw bolt 44, as shown in FIGS. 4A and 4B. The distance 42 is controllable in a plurality of increments according to the pitch of the helices that define the positions of the holes 34 in the outer body portion 32 and the positions of the holes 40 in the inner portion 37 of the adjustable universal spacer 30. The adjustable plurality of increments of the distance 42 corresponds to the axial movement limits on the cam 18, for example corresponding to the width of the prior art spacer blocks 10 shown in FIGS. 1A, 1B. In other words, the distance 42 in FIG. 4A is controlled by the relative positions of the outer body portion 32 of the universal spacer 30, which are affixed relative to one another by the pin 36 and a specific set of two holes 34 and two holes 40 (FIGS. 2 and 3) through which the pin is placed. Note that while a single traveling shaft 16 is shown, there are preferably two traveling shafts, with the not shown being disposed at the other end of the drum 10.

Indicator numbers, not shown, can be stamped or printed adjacent the holes 34 on the outer cylindrical body portion 32 and aligning with the holes 40 on the end of inner cylinder 37. The indicator numbers correspond to translational distances 42 shown in FIG. 4A and allow rapid, repeatable fixing of the desired maximum translational distances 42.

While the invention has been specifically illustrated and described, those skilled in the art will recognize that the invention may be variously modified and practiced without departing from the concepts of the invention. The scope of the invention is limited only by the following claims.

What is claimed:

1. A tire building drum having a universal spacer for varying the diameter of the tire building drum, the universal spacer comprising:

a cylindrical outer body portion having a plurality of sets of diametrically opposed holes extending therethrough;

an inner cylindrical portion having at least two diametrically opposed holes therethrough, the inner cylindrical portion being connected by at least one traveling shaft to the building drum for varying the diameter of the building drum; and means for interconnecting one of the sets of holes in the outer cylindrical body portion with at least two of the at least two holes in the inner cylindrical portion to incrementally adjust the travel distance of the traveling shaft and thereby control the diameter of the building drum.

2. The tire building drum of claim 1 wherein the means for interconnecting the outer cylindrical body portion with the inner body portion is a pin.

3. The tire building drum of claim 2 in which the pin is slideably engagable through any two diametrically opposed holes in the outer cylindrical body portion and through at least two diametrically opposed holes of the inner cylindrical body portion.

4. The tire building drum of claim 2 in which one end of the pin is affixed with a finger grasping flange having a ring attached thereto.

5. The tire building drum of claim 2 wherein the sets of diametrically opposing holes in the outer cylindrical body portion are regularly spaced and are situated so as to comprise a plurality of diametrically opposed hole sets through which the pin can be inserted while also engaging at least two of the diametrically opposing holes in the inner moveable cylindrical body portion in such a way as to provide incremental and repeatable adjustment of the axial relationship of the outer cylindrical body portion and the inner cylindrical body portion.

6. The tire building drum of claim 1 in which indicator numbers are located adjacent the holes so as to allow repeatable incremental adjustment of the relative axial positions of the outer cylindrical body portion and the inner cylindrical body portion by the means for interconnecting the outer cylindrical body portion with the inner cylindrical portion.

7. The tire building drum of claim 4 in which the sets of diametrically opposing holes in the outer cylindrical body portion are arranged so as to comprise a regular double helical pattern about the circumference of the outer cylindrical body portion.

8. A method of varying the diameter of a tire tread breaker building drum, the method comprising:

providing a cylindrical outer body portion having a plurality of sets of diametrically opposed holes extending therethrough;

providing an inner cylindrical portion having at least two diametrically opposed holes therethrough, the inner cylindrical portion being connected by a traveling shaft to a cam component of the building drum for varying the diameter of the building drum; and interconnecting one of the sets of holes in the outer cylindrical body portion with at least two of the at least two holes in the inner cylindrical portion to incrementally adjust the travel distance of the traveling shaft and thereby control the diameter of the building drum.

9. The method of claim 8 wherein: interconnecting the outer cylindrical body portion with the inner body portion is accomplished with a pin.

10. The method of claim 9 including: slideably engaging the pin through any two diametrically opposed holes in the outer cylindrical body portion and through at least two diametrically opposed holes of the inner cylindrical body portion.

* * * * *